(12) United States Patent
Yamaguchi et al.

(10) Patent No.: US 11,267,441 B2
(45) Date of Patent: Mar. 8, 2022

(54) INFORMATION PROCESSING APPARATUS, PROGRAM, AND INFORMATION PROCESSING SYSTEM

(71) Applicant: KONICA MINOLTA, INC., Tokyo (JP)

(72) Inventors: Takehisa Yamaguchi, Ikoma (JP); Takeshi Morikawa, Takarazuka (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/946,206

(22) Filed: Jun. 10, 2020

(65) Prior Publication Data

US 2021/0001808 A1  Jan. 7, 2021

(30) Foreign Application Priority Data

Jul. 4, 2019 (JP) .............................. JP2019-125257

(51) Int. Cl.
| | |
|---|---|
| *G06K 9/00* | (2006.01) |
| *B60R 25/24* | (2013.01) |
| *H04W 4/40* | (2018.01) |
| *B60R 25/30* | (2013.01) |
| *H04L 67/12* | (2022.01) |
| *H04N 5/225* | (2006.01) |

(52) U.S. Cl.
CPC ............ *B60R 25/24* (2013.01); *B60R 25/305* (2013.01); *G06K 9/00362* (2013.01); *H04W 4/40* (2018.02); *H04L 67/12* (2013.01); *H04N 5/2253* (2013.01)

(58) Field of Classification Search
CPC .................................................. G06K 9/00362
See application file for complete search history.

(56) References Cited

U.S. PATENT DOCUMENTS

| | | | | |
|---|---|---|---|---|
| 2009/0121850 A1* | 5/2009 | Tanaka | .................. | B60R 25/305 340/426.24 |
| 2009/0289759 A1* | 11/2009 | Tsuchiya | ............. | G07C 9/00309 340/5.72 |
| 2014/0309814 A1* | 10/2014 | Ricci | ........................ | B60R 25/00 701/2 |
| 2016/0126995 A1* | 5/2016 | Li | ........................... | H04W 4/00 455/558 |
| 2019/0089807 A1 | 3/2019 | Ahmed | | |
| 2019/0380014 A1* | 12/2019 | Onishi | ............. | G08G 1/096791 |

FOREIGN PATENT DOCUMENTS

| | | |
|---|---|---|
| JP | 2008009615 A | 1/2008 |
| JP | 5181182 B2 | 1/2013 |
| WO | 2014172397 A1 | 10/2014 |

OTHER PUBLICATIONS

The extended European Search Report dated Nov. 30, 2020, by the European Patent Office in corresponding European Application No. 20182771.4. (8 pages).

* cited by examiner

*Primary Examiner* — Benyam Haile

(74) *Attorney, Agent, or Firm* — Buchanan Ingersoll & Rooney PC

(57) ABSTRACT

There is provided an information processing apparatus installed in a mobile object, the information processing apparatus including: a hardware processor that detects entry/exit of a user into/from the mobile object; and controls a security level in the mobile object, in accordance with entry/exit of a user into/from the mobile object.

25 Claims, 10 Drawing Sheets

INFORMATION PROCESSING APPARATUS, PROGRAM, AND INFORMATION PROCESSING SYSTEM

The entire disclosure of Japanese patent Application No. 2019-125257, filed on Jul. 4, 2019, is incorporated herein by reference in its entirety.

BACKGROUND

Technological Field

The present disclosure relates to security level control to be performed by an information processing apparatus installed in a mobile object.

Description of the Related Art

There have been various techniques suggested for controlling security levels. For example, JP 5181182 B1 discloses a technique relating to security control in a wireless communication device. By this technique, when an access management server detects entry of another wireless communication resource into the management area, the data of the other wireless communication resource is broadcast to the wireless communication device. By this technique, the wireless communication device blocks information accessed by the wireless communication device, depending on the contents of the broadcast data.

JP 2008-9615 A discloses a technique for controlling a security system that sets a security level suitable for the surrounding environment in accordance with the sensing data of the surrounding environment of a vehicle, and executes a security function in accordance with the set security level.

In recent years, various techniques relating to mobility services using a mobile object, such as provision of an office environment using a mobile object, have been suggested. In mobility services, controlling the security level of the environment provided in a mobile object is also considered an important technology. For example, in a mobility service that provides an office environment, the provided environment needs to be managed at a security level equal to the security level in an actual office.

By a conventional technique, on the other hand, only optimization of the security level on the outside of the system to be controlled is taken into consideration, and optimization of the security level inside the system to be controlled has not been sufficiently studied.

SUMMARY

The present disclosure is made in view of the above circumstances, and an object of the present disclosure is to provide a technology for controlling, at an optimized security level, the environment in a mobile object in which an information processing apparatus is installed.

To achieve the abovementioned object, according to an aspect of the present invention, there is provided an information processing apparatus installed in a mobile object, and the information processing apparatus reflecting one aspect of the present invention comprises: a hardware processor that: detects entry/exit of a user into/from the mobile object; and controls a security level in the mobile object, in accordance with entry/exit of a user into/from the mobile object.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
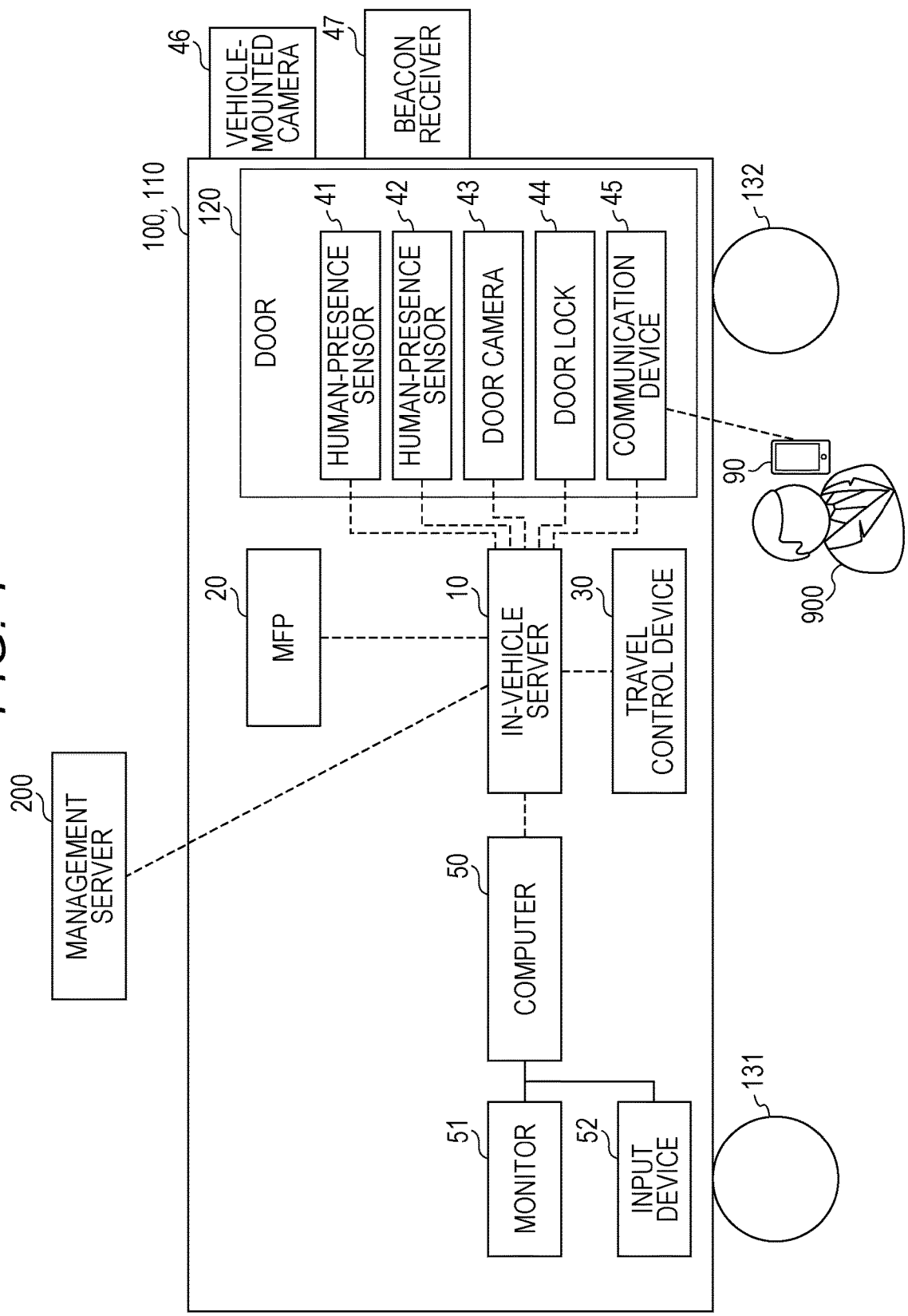
FIG. 1 is a diagram showing an example configuration of an information processing system according to an embodiment of the present disclosure.

Hereinafter, one or more embodiments of the present invention will be described with reference to the drawings. However, the scope of the invention is not limited to the disclosed embodiments. In the description below, like components and constituent elements are denoted by like reference numerals. Like components and constituent elements also have like names and functions. Therefore, explanation of them will not be unnecessarily repeated.

1. Configuration of an Information Processing System

FIG. 1 is a diagram showing an example configuration of an information processing system according to an embodiment of the present disclosure. The information processing system shown in FIG. 1 includes an automobile 100 and a management server 200. The automobile 100 can communicate with the management server 200. In one embodiment, the automobile 100 is embodied by a concept car for providing an office environment.

The automobile 100 includes a vehicle body 110, front wheels 131, and rear wheels 132. The vehicle body 110 has a door 120 for getting into the automobile 100. The door 120 can be opened and closed. The automobile 100 is equipped with an in-vehicle server 10 that controls the automobile 100.

Human-presence sensors 41 and 42 for detecting a user getting on and off the automobile 100 are mounted on the door 120. Detection outputs of the human-presence sensors 41 and 42 are transmitted to the in-vehicle server 10. In one embodiment, the human-presence sensor 41 is located closer to the outside of the vehicle than the human-presence sensor 42. When the human-presence sensor 42 detects an object within a predetermined time since the point of time at which the human-presence sensor 41 has detected the object, the in-vehicle server 10 can determine that the object has got into the automobile 100. When the human-presence sensor 41 detects an object within a predetermined time since the point of time at which the human-presence sensor 42 has detected the object, the in-vehicle server 10 can determine that the object has got off the automobile 100.

A door camera 43 is mounted on the door 120. An image captured by the door camera 43 is transmitted to the in-vehicle server 10. In one embodiment, the in-vehicle server 10 can acquire, from the door camera 43, an image of an object getting on or off the automobile 100.

A door lock 44 is mounted on the door 120. In one embodiment, the door lock 44 includes a mechanism (such as a solenoidal coil) for locking and unlocking the door 120. The in-vehicle server 10 can control the door lock 44 to lock and unlock the door 120.

A communication device 45 is mounted on the door 120. In one embodiment, the communication device 45 performs short-range communication with a terminal 90 carried by a user 900. The short-range communication is communication compliant with the Bluetooth (registered trademark) standards, or infrared communication, for example. The communication device 45 can communicate with the in-vehicle server 10. In one embodiment, the in-vehicle server 10 can identify the user 900 getting into (or getting off) the automobile 100 by acquiring user information (such as a user ID and a password) stored in the terminal 90 from the communication device 45.

A vehicle-mounted camera 46 that captures an image of the outside of the vehicle is mounted on the vehicle body 110. The image captured by the vehicle-mounted camera 46 is transmitted to the in-vehicle server 10. In one embodiment, the in-vehicle server 10 can identify a user who has got off the automobile 100 from an image captured by the vehicle-mounted camera 46. In a case where the in-vehicle server 10 can no longer identify a user in an image captured by the vehicle-mounted camera 46 after the user getting off the automobile 100 is detected, the in-vehicle server 10 can determine that the user has moved sufficiently away from the automobile 100 (has moved at least a predetermined distance away from the automobile 100, for example).

A beacon receiver 47 that receives a beacon is mounted on the vehicle body 110. The beacon receiver 47 transmits a detection output to the in-vehicle server 10. In one embodiment, the in-vehicle server 10 can detect that the user 900 is within a certain distance from the automobile 100, on the basis of a fact that the beacon receiver 47 has received a beacon transmitted from the terminal 90 carried by the user 900. Alternatively, the in-vehicle server 10 can detect that the user 900 is not within the certain distance from the automobile 100, on the basis of a fact that the beacon receiver 47 has not received the beacon.

A multi-functional peripheral (MFP) 20, a travel control device 30, a computer 50, a monitor 51, and an input device 52 are further mounted on the automobile 100.

The MFP 20 is a multifunctional device having a copy function, a print function, and a scan function. The travel control device 30 controls running of the automobile 100. More specifically, the automobile 100 includes a mechanism (including a motor, for example) for driving front wheels 131 and/or the rear wheels 132. The travel control device 30 controls operation of the mechanism The computer 50 includes a processor and a memory. The processor executes a predetermined program. The computer 50 causes the monitor 51 to display information, and accepts an input of information via the input device 52. The monitor 51 is formed with an organic electroluminescence (EL) display, for example. The input device 52 is formed with a keyboard and/or a mouse, for example. Alternatively, the input device 52 may be formed with a touch sensor.

2. Hardware Configuration

In the description below, the hardware configurations of the devices constituting the information processing system shown in FIG. 1 are explained.

(In-Vehicle Server 10)

Figure 2:
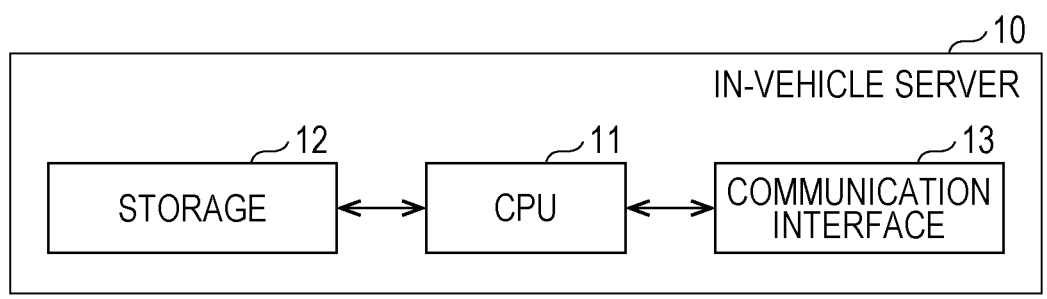
FIG. 2 is a diagram showing an example hardware configuration of an in-vehicle server.

FIG. 2 is a diagram showing an example hardware configuration of the in-vehicle server 10. The in-vehicle server 10 includes a central processing unit (CPU) 11, a storage 12, and a communication interface 13. The CPU 11 executes a predetermined program, to control the in-vehicle server 10. Instead of or in addition to the CPU 11, the in-vehicle server 10 may include electronic circuitry such as an application specific integrated circuit (ASIC) that controls the in-vehicle server 10.

The storage 12 can store the program to be executed by the CPU 11, and/or data for control. The storage 12 is formed with a hard disk, for example.

The communication interface 13 is a communication circuit for causing the in-vehicle server 10 to communicate with another device (such as the MFP 20), and is formed with a network interface card (NIC), for example.

(MFP 20)

Figure 3:
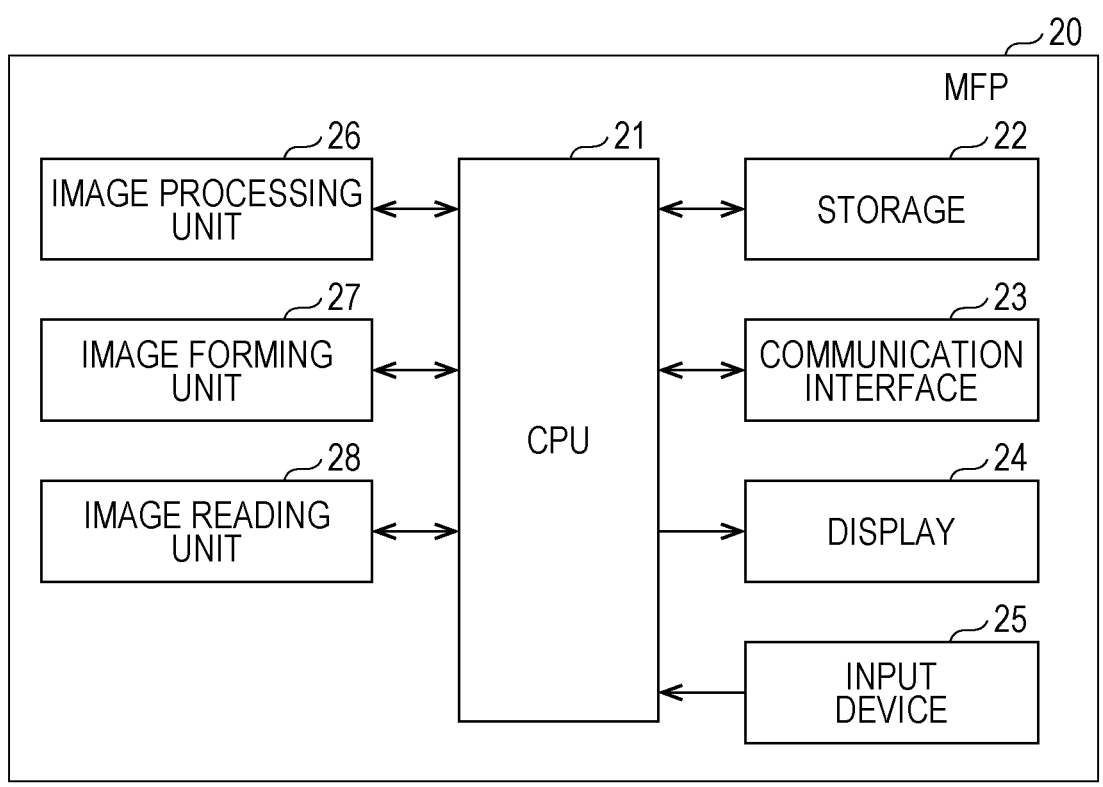
FIG. 3 is a diagram showing an example hardware configuration of an MFP.

FIG. 3 is a diagram showing an example hardware configuration of the MFP 20. The MFP 20 includes a CPU 21, a storage 22, a communication interface 23, a display 24, an input device 25, an image processing unit 26, an image forming unit 27, and an image reading unit 28.

The CPU 21 executes a predetermined program, to control the MFP 20. Instead of or in addition to the CPU 21, the MFP 20 may include electronic circuitry such as an ASIC that controls the MFP 20.

The storage 22 can store the program to be executed by the CPU 21, and/or data for control. The storage 22 is formed with a hard disk, for example.

The communication interface 23 is a communication circuit for causing the MFP 20 to communicate with another device (such as the in-vehicle server 10), and is formed with a NIC, for example.

The display 24 is formed with an organic electroluminescence (EL) display, for example, and displays the state of the MFP 20. The input device 25 is formed with hardware buttons and/or software buttons displayed on the display 24. The display 24 and the input device 25 may be combined, to form a touch panel.

The image processing unit 26 performs various kinds of processing, such as image enlargement/reduction, on image data that has been input to the MFP 20. In one embodiment, the image processing unit 26 includes an ASIC and a memory for image processing.

The image forming unit 27 forms an image on a recording paper sheet. In one embodiment, the image forming unit 27 includes a photoconductor, hardware resources for outputting the toner contained in a toner cartridge to the photoconductor, and hardware resources for conveying recording paper sheets.

The image reading unit 28 generates image data of a document. In one embodiment, the image reading unit 28 includes hardware resources for reading image data, such as an image scanner.

(Travel Control Device 30)

Figure 4:
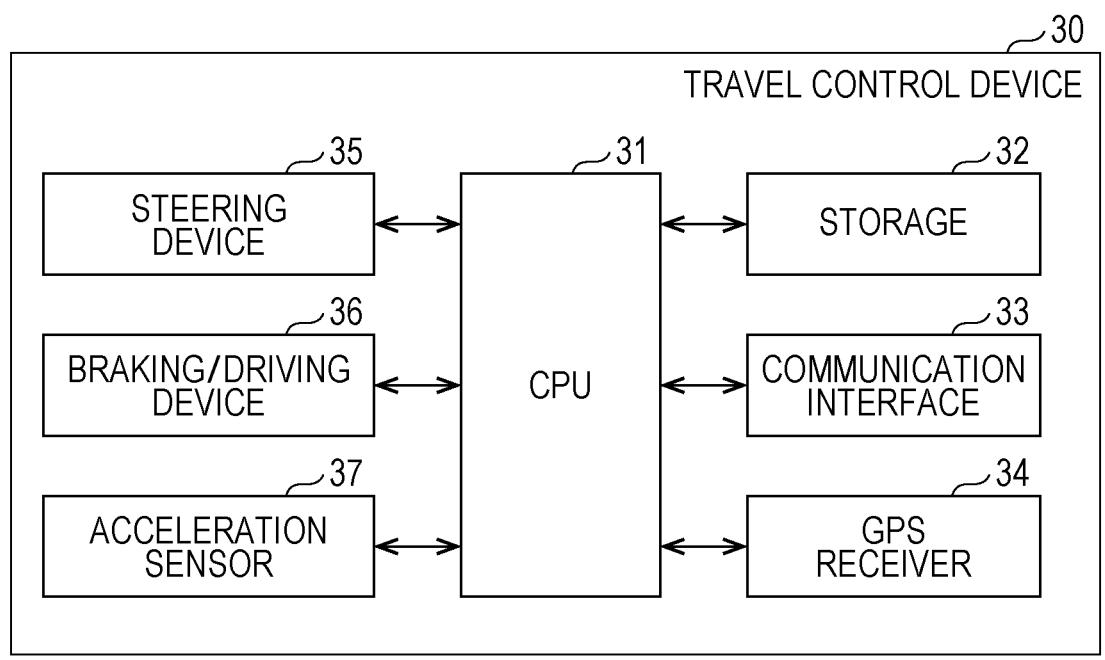
FIG. 4 is a diagram showing an example hardware configuration of a travel control device.

FIG. 4 is a diagram showing an example hardware configuration of the travel control device 30. The travel control device 30 controls running of the automobile 100.

As shown in FIG. 4, the travel control device 30 includes a CPU 31, a storage 32, a communication interface 33, a global positioning system (GPS) receiver 34, a steering device 35, a braking/driving device 36, and an acceleration sensor 37.

The CPU 31 executes a predetermined program, to control the travel control device 30. Instead of or in addition to the CPU 31, the travel control device 30 may include electronic circuitry such as an ASIC that controls the travel control device 30.

The storage 32 can store the program to be executed by the CPU 31, and/or data for control. The storage 32 is formed with a hard disk, for example.

The communication interface 33 is a communication circuit for causing the travel control device 30 to communicate with another device (such as the in-vehicle server 10), and is formed with a NIC, for example.

The GPS receiver 34 receives a signal from a GPS satellite, and performs a predetermined calculation using the signal, to detect the position of the automobile 100. The GPS receiver 34 outputs information about the detected position to the CPU 31.

The steering device 35 controls the steering angle of the wheels (the front wheels 131 and/or the rear wheels 132) of the automobile 100. In one implementation, the steering device 35 is formed with electronic circuitry that controls driving of an actuator for adjusting the angle of the wheels.

The braking/driving device 36 controls braking/driving of the wheels of the automobile 100. In one embodiment, the braking/driving device 36 is formed with electronic circuitry for adjusting the amount of rotation of a motor for rotating the wheels.

The acceleration sensor 37 detects the acceleration applied to the automobile 100. In one embodiment, the acceleration sensor 37 detects the accelerations in the following three directions: the traveling direction (the frontward/backward direction) of the automobile 100, and the two directions (the rightward/leftward direction and the vertical direction) perpendicular to the traveling direction.

3. Example of a Service Using the Automobile 100

In the present disclosure, a mobile office is described as an example of a mobility service using the automobile 100. In this example, the automobile 100 provides a user with an office environment. The automobile 100 controls the security level in the automobile 100, in accordance with the user getting on and off the automobile 100. Thus, it is possible to provide a user with a working style that is not limited by location, such as teleworking.

(Identification Information About Each User)

The management server 200 includes a storage such as a hard disk. Information associated with respective users (this information will be hereinafter also referred to as the "identification information") is stored in the storage of the management server 200.

The identification information includes the following elements, for example.

User ID

Route setting

System environment

Working data

Rank

The "user ID" identifies each user.

The "route setting" identifies the destination and the travel route of the automobile 100. Note that the "route setting" may include only the destination of the automobile 100. The travel control device 30 can set a travel route in accordance with the destination The "route setting" may include only the travel route of the automobile 100. The final destination may be set by a user in the automobile 100. The user can input a destination to the travel control device 30 via the computer 50, using the input device 52.

The "system environment" is information that specifies an environment for the in-vehicle server 10 to communicate with the management server 200. One example of the information forming the "system environment" is the network environment of the in-vehicle server 10. The network environment includes the settings (such as the server name, the user name, and the password) for the in-vehicle server 10 to connect to the management server 200 within a virtual private network (VPN).

The "working data" specifies the working state of a user in the automobile 100 after getting into the automobile 100. An example of the "working data" may be a document edited or generated by a predetermined application that may be executed in the computer 50, or may be the editing history of such a document.

The "rank" identifies the rank (such as a manager or a member) assigned to each user.

(Entry Process)

Figure 5:
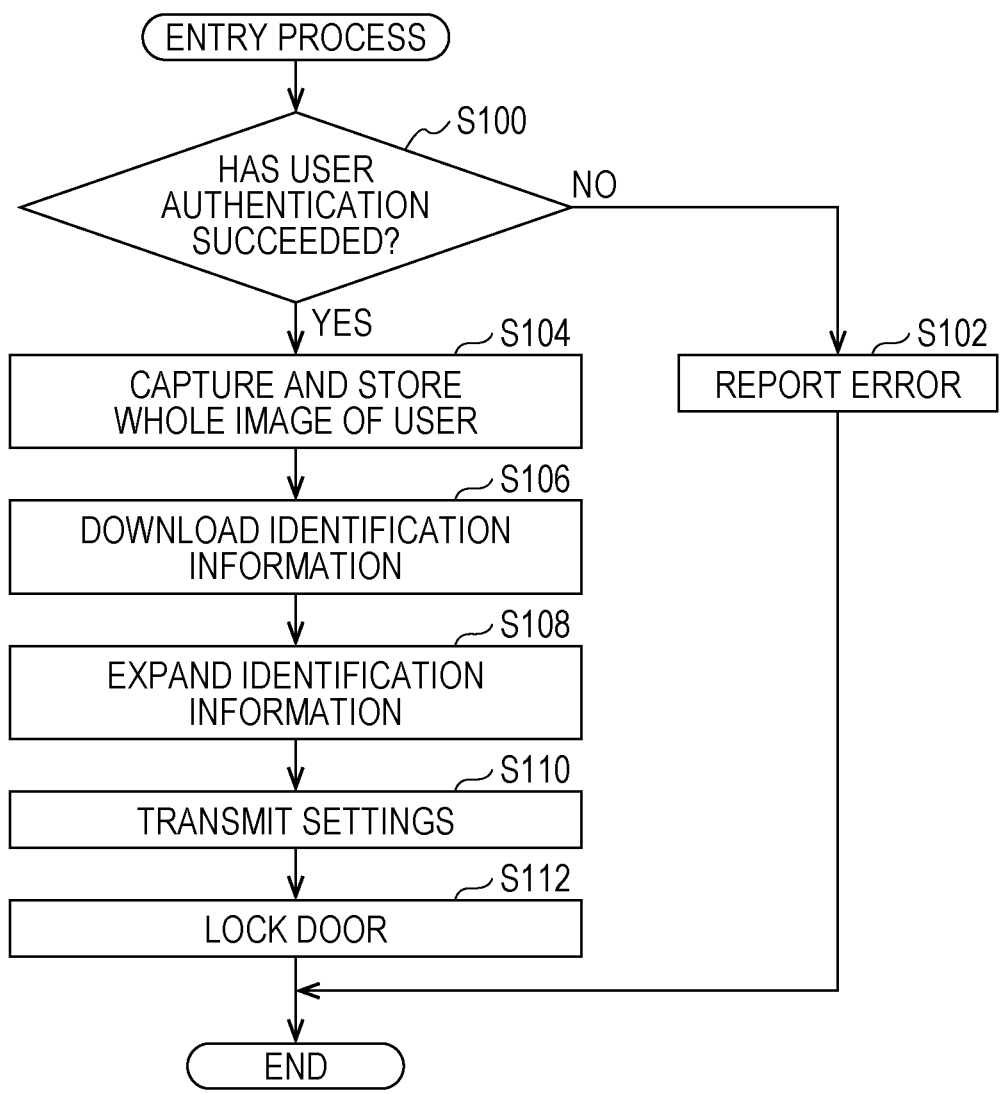
FIG. 5 is a flowchart of a process (an entry process) to be performed when entry of an object into an automobile is detected.

FIG. 5 is a flowchart of a process (an entry process) to be performed when entry of an object into the automobile 100 is detected. The process shown in FIG. 5 is realized by the CPU 11 of the in-vehicle server 10 executing a predetermined program. In one embodiment, the CPU 11 starts the process shown in FIG. 5, in response to detection of an object by the human-presence sensor 42 within a predetermined time since the point of time at which the human-presence sensor 41 detected the object.

Referring to FIG. 5, in step S100, the CPU 11 determines whether user authentication has succeeded. In one embodiment, information (authentication information) for authenticating a user is registered beforehand in the storage 12. More specifically, the administrator of the information processing system registers the authentication information about the user who has reserved the automobile 100, in the storage 12 in advance. The CPU 11 authenticates the user, using information acquired when the object entered the automobile 100 and the authentication information described above.

For example, when entering the automobile 100, the user 900 holds the terminal 90 over the communication device 45. The terminal 90 stores information for user authentication. The communication device 45 reads the information for user authentication from the terminal 90 by short-range communication, and transmits the information to the in-vehicle server 10. The CPU 11 acquires the information for user authentication from the communication device 45, and checks the information against the authentication information registered in advance. If these pieces of information match, the CPU 11 determines that the user authentication has succeeded, and if not, determines that the user authentication has failed.

The authentication using communication between the communication device 45 and the terminal 90 is an example of user authentication. Other examples include any other forms of user authentication, such as authentication using an image (such as a face image, the iris, or a fingerprint) captured by the door camera 43, authentication using voice (a voiceprint), and the like.

The authentication information is not necessarily registered in the storage 12 in advance. The authentication information may be registered in the management server 200 in advance. When the CPU 11 detects that an object has entered the automobile 100, the CPU 11 may request the authentication information from the management server 200. The management server 200 may transmit the authentication information to the in-vehicle server 10, in response to the request from the CPU 11.

If the CPU 11 determines that the user authentication has succeeded (YES in step S100), the CPU 11 proceeds with the control to step S104, and if not (NO in step S100), proceeds with the control to step S102.

In step S102, the CPU 11 reports the error, and ends the process shown in FIG. 5. An example of the error report is to display the failure of the user authentication on a predetermined display device (the monitor 51 and/or a lamp (not shown), for example) mounted on the automobile 100. Another example is to output a sound indicating the occurrence of an error. Yet another example is to notify the management server 200 that the user authentication has failed.

In step S104, the CPU 11 captures a whole image of the entering user with door camera 43, and stores the whole image into the storage 12. The CPU 11 may determine whether the captured image includes the entire body of the user, and cause the door camera 43 to repeatedly capture an image until an image including the entire body of the user is captured. In determining whether the entire body of the user is included in the image, the CPU 11 may use a pattern recognition technique, for example.

In step S106, the CPU 11 downloads, from the management server 200, the identification information about the user authenticated in step S100. The CPU 11 transmits a request for the identification information, together with the information (such as the user ID) for identifying the user, for example, to the management server 200. In response to the request, the management server 200 transmits the identification information to the in-vehicle server 10.

At least part of the identification information may be stored in the form of a snapshot in the management server 200. In step S106, the snapshot may be downloaded.

In step S108, the CPU 11 expands the identification information downloaded in step S106. In a case where the identification information has been downloaded in the form of a snapshot, the snapshot is expanded in step S108.

The expansion of the identification information includes registering the settings included in the identification information in a location where the settings should be stored. The CPU 11 may register the setting values for communication in the storage 12, in accordance with the "system environment" in the identification information. The CPU 11 may register the setting values of the operating system (OS) and/or the applications to be executed in the in-vehicle server 10 in the storage 12, in accordance with the "working data".

In step S110, the CPU 11 transmits the settings of the other devices in the automobile 100 included in the identification information to each device. For example, the CPU 11 may provide the computer 50 with the "working data". As a result, the setting values in accordance with the "working data" are registered in the computer 50, and the operation history of the user is reproduced in the computer 50.

The CPU 11 may also transmit the "rank" in the identification information to the MFP 20. The "rank" includes a "manager" or a "member", for example. A "manager" is higher in rank than a "member". The "rank" may designate a security level of each device mounted on the automobile 100. In one example, the CPU 21 of the MFP 20 controls the security level of the MFP 20, in accordance with the transmitted "rank". For example, in a case where the "rank" of the user is a "manager", the CPU 21 prints all the files stored in MFP 20 in accordance with a print instruction. In a case where the "rank" of the user is a "member", the CPU 21 does not print some files (such as files having a "high" confidentiality level tag attached thereto) stored in the MFP 20 even if the CPU 21 has received a print instruction, but prints the rest of the files in accordance with the print instruction.

The CPU 11 may also transmit the "route setting" in the identification information to the travel control device 30. The CPU 31 of the travel control device 30 controls operation of the travel control device 30, in accordance with the "route setting". That is, the CPU 31 controls operation of the wheels so that the automobile 100 travels to the destination specified in "route setting" through the route specified in "route setting".

In step S112, the CPU 11 causes the door lock 44 to lock the door 120, and ends the process shown in FIG. 5.

As a result, the automobile 100 can start running. A user can perform work with the computer 50, using the operation history of the user. The MFP 20 can operate at the security level according to the "rank" of the user.

In the entry process described above, when the CPU 11 detects entry of a user into the automobile 100, the CPU 11 downloads the identification information about the user from the management server 200, and stores the identification information into the storage 12. Storing the identification information (information unique to the user) into the automobile 100 in response to entry of the user into the automobile 100 is an example of controlling the security level of the automobile 100 in accordance with entry/exit of a user. In this sense, a controller is formed by the CPU 11 and the part of the program for causing the CPU 11 to download the identification information and store the identification information into the storage 12.

The identification information may include the network environment (such as VPN settings) of the user. Using the network environment specified in the identification information, the in-vehicle server 10 installed in the automobile 100 can communicate with the management server 200. The in-vehicle server 10 can communicate with the computer 50. Accordingly, the computer 50 in the automobile 100 can be connected to the management server 200 within a VPN. In a case where the management server 200 is installed in the user's office, the user can use the computer 50 to use the files stored in the management server 200 in the same environment as in the office. In this sense, the automobile 100 can function as a mobile office for the user.

The CPU 11 detects entry of an object, using detection outputs of the human-presence sensors 41 and 42. The CPU 11 further authenticates (identifies) the user who has entered the automobile 100, using the authentication information and the information obtained by the communication device 45 from the terminal 90. In this sense, an entry/exit detector is formed by the CPU 11 and the part of the program for causing the CPU 11 to detect entry of the user into the automobile 100. Note that the CPU 11 may identify a user, using biometric identification detected by the door camera 43 or the like, instead of or in addition to the information obtained by the communication device 45 from the terminal 90.

(Exit Process)

Figure 6:
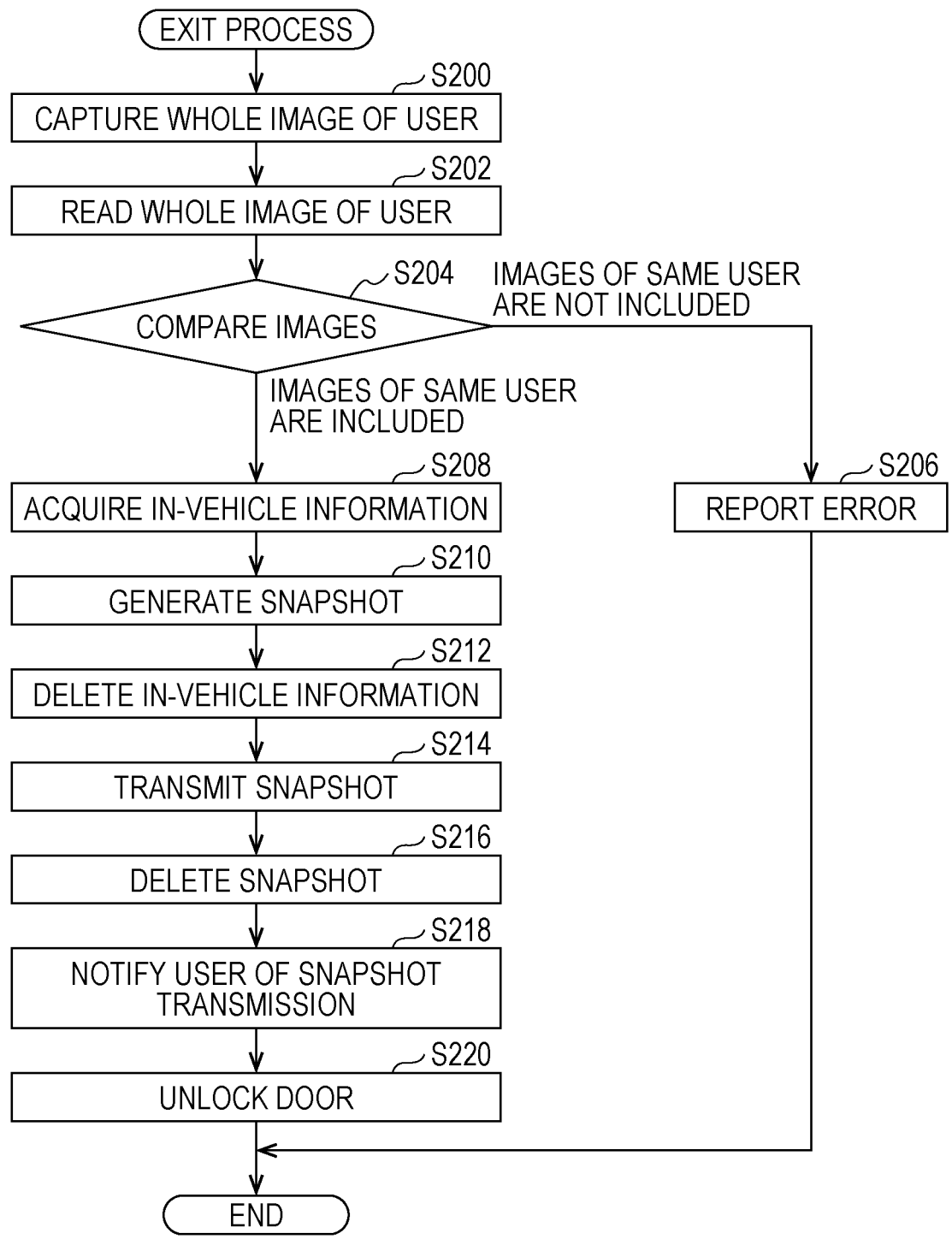
FIG. 6 is a flowchart of a process (an exit process) to be performed when exit of an object from the automobile is detected.

FIG. 6 is a flowchart of a process (an exit process) to be performed when exit of an object from the automobile 100 is detected. The process shown in FIG. 6 is realized by the CPU 11 of the in-vehicle server 10 executing a predetermined program. In one embodiment, the CPU 11 starts the process shown in FIG. 6, in response to detection of an object by the human-presence sensor 41 within a predetermined time since the point of time at which the human-presence sensor 42 detected the object.

In step S200, the CPU 11 captures a whole image of an exiting user with the door camera 43. The CPU 11 may determine whether the captured image includes the entire body of the user, and cause the door camera 43 to repeatedly capture an image until an image including the entire body of the user is captured. In determining whether the entire body of the user is included in the image, the CPU 11 may use a pattern recognition technique, for example.

In step S202, the CPU 11 reads the whole image of the user stored in step S104.

In step S204, the CPU 11 compares the whole image captured in step S200 with the whole image read in step S202, and determines whether these images include images of the same user. In one embodiment, the comparison in step S204 includes extracting feature amounts from the images and comparing the feature amounts with each other. If the feature amounts match, the images are determined to include images of the same user. If the CPU 11 determines that the two whole images include images of the same user (YES in step S204), the CPU 11 proceeds with the control to step S208, and if not (NO in step S204), proceeds with the control to step S206.

In step S206, the CPU 11 reports the error, and ends the process shown in FIG. 6. One example of the error report is to cause a predetermined display mounted on the automobile 100 to indicate that an unauthorized user is in the automobile 100. Another example is to output a sound indicating the occurrence of an error. Yet another example is to notify the management server 200 that an error has occurred.

In step S208, the CPU 11 acquires in-vehicle information. The in-vehicle information includes settings for communication and the like in the in-vehicle server 10, and the working data in the in-vehicle server 10 and the respective devices (the MFP 20, the computer 50, and the like) in the automobile 100.

In step S210, the CPU 11 generates a snapshot of the working data. More specifically, the CPU 11 generates a snapshot of the storage 12 of the in-vehicle server 10, the storage 22 of the MFP 20, the storage 32 of the travel control device 30, and the storage of the computer 50, and stores the snapshot into the storage 12.

In step S212, the CPU 11 deletes the in-vehicle information in the in-vehicle server 10 and the respective devices.

In step S214, the CPU 11 transmits the snapshot generated in step S210 to the management server 200.

In step S216, the CPU 11 deletes the snapshot stored in the storage 12 of the in-vehicle server 10.

The "identification information" downloaded in step S106 is expanded in the in-vehicle server 10 in step S108, and is transmitted to each device in the automobile 100 in step S110. The snapshot generated in step S210 includes the "identification information" that has been expanded in the in-vehicle server 10 and been transmitted to each device. As the snapshot is transmitted to the management server 200 in step S216, the identification information is transmitted to the management server 200. Note that the "identification information" can be updated in information processing in the in-vehicle server 10 or in each device. For example, in a case where a user performs work with the computer 50, the working data included in the "identification information" can be updated in accordance with the work. In step S216, the updated "identification information" may be transmitted to the management server 200.

In step S218, the CPU 11 notifies the exiting user that the data used by the user in the automobile 100 has been deleted. The address of the exiting user may be included as a mail address in the "identification information" about the user, for example.

In step S220, the CPU 11 causes the door lock 44 to unlock the door 120, and ends the process shown in FIG. 6.

In the exit process described above with reference to FIG. 6, the CPU 11 transmits a snapshot including the "identification information" about a user to the management server 200, in response to detection of exit of the user. After that, the CPU 11 deletes the snapshot from the in-vehicle server 10. Deleting the identification information (information unique to the user) from the automobile 100 in response to exit of the user from the automobile 100 is an example of controlling the security level of the automobile 100 in accordance with entry/exit of a user. In this sense, a controller is formed by the CPU 11 and the part of the program for causing the CPU 11 to delete the identification information from the storage 12.

The deletion of the snapshot in step S216 is realized by the CPU 11 updating the area storing the data of the snapshot with "0" data, for example. The CPU 11 may change the number of times the deletion process in step S216 is performed, in accordance with the confidentiality of the data included in the snapshot. More specifically, in a case where the CPU 11 generates a snapshot of the storage 22 of the MFP 20, the CPU 11 obtains the confidentiality of the file that is the processing target (a print target, for example) in the MFP 20 at that point of time. In accordance with the confidentiality, the CPU 11 determines the number of times the deletion process is to be performed on the area in the storage 12 in which the snapshot of the storage 22 is stored. In one embodiment, the confidentiality may be set on three scales of "1", "2", and "3". In this case, "1" indicates the lowest confidentiality, and "3" indicates the highest confidentiality. The CPU 11 determines "1" to be the number of times the deletion process is to be performed in a case where the confidentiality is "1", determines "2" to be the number of times the deletion process is to be performed in a case where the confidentiality is "2", and determines "3" to be the number of times the deletion process is to be performed in a case where the confidentiality is "3".

The in-vehicle server 10 can process information about each user in a case where there is a plurality of users. For example, in a case where a user A and a user B are in the automobile 100, if the user A logs in to the in-vehicle server 10, the user A can use the devices (the MFP 20, the computer 50, and the like) in the automobile 100. If the user B logs in to the in-vehicle server 10, the user B can use the devices in the automobile 100. Using the "identification information" about each user, the in-vehicle server 10 and each device generate working data for each user.

In this case, the CPU 11 can generate in-vehicle information and generate a snapshot for each of the users.

The CPU 11 can further detect that only some of the users has got off the automobile 100. For example, in a case where the CPU 11 determines in step S204 that the image captured in step S200 matches the image of the user B, the CPU 11 detects exit of only the user B. In this case, the CPU 11 can transmit a snapshot regarding the user B to the management server 200, and delete the snapshot from the storage 12.

(Shock Coping Process)

Figure 7:
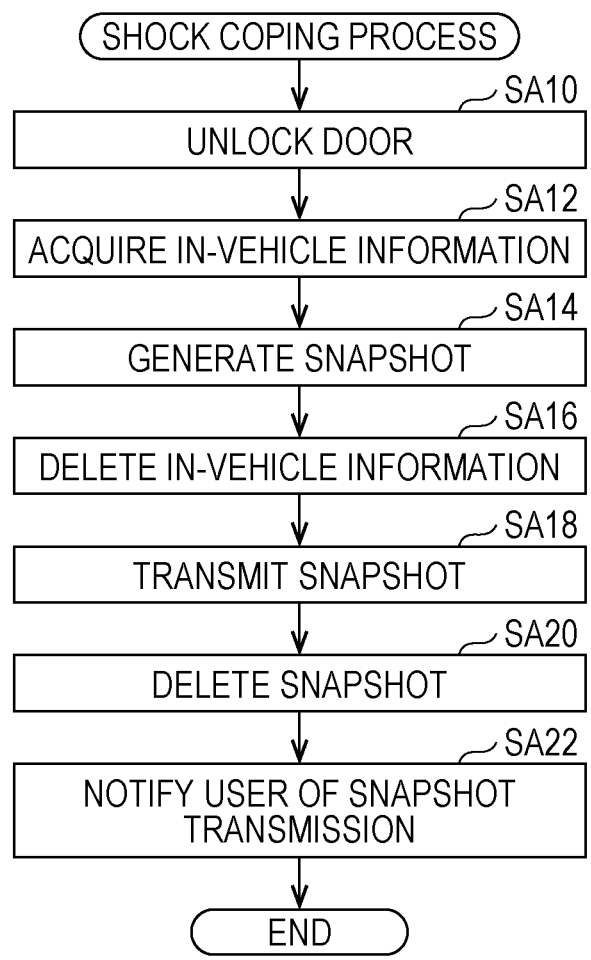
FIG. 7 is a flowchart of a process (a shock coping process) to be performed when a great shock is applied to the automobile.

FIG. 7 is a flowchart of a process (a shock coping process) to be performed when a great shock is applied to the automobile 100. The process shown in FIG. 7 is realized by the CPU 11 of the in-vehicle server 10 executing a predetermined program. In one embodiment, the CPU 11 starts the process shown in FIG. 7, in response to reception of a notification, from the travel control device 30, that a shock equal to or greater than a certain threshold has been applied to the automobile 100. The CPU 31 of the travel control device 30 may determine whether a shock equal to or greater than the certain threshold has been applied to the automobile 100, on the basis of a detection output of the acceleration sensor 37. Alternatively, the CPU 31 may transmit the above notification to the in-vehicle server 10 when determining that such a shock has been applied to the automobile 100.

The process shown in FIG. 7 may be started when the shock is applied to the automobile 100 while a user is in the automobile 100. An example of a period during which a user is in the automobile 100 is a period from the locking in step S112 in FIG. 5 till the unlocking in step S220 in FIG. 6.

Referring to FIG. 7, in step SA10, the CPU 11 causes the door lock 44 to unlock the door 120.

The control in steps SA12 through SA14 in FIG. 7 corresponds to the control in steps S208 through S216 in FIG. 6.

That is, in step SA12, the CPU 11 acquires the in-vehicle information as in step S208.

In step SA14, the CPU 11 generates a snapshot of the working data as in step S210.

In step SA16, the CPU 11 deletes the in-vehicle information in the in-vehicle server 10 and the respective devices as in step S212.

In step SA18, the CPU 11 transmits the snapshot generated in step SA14 to the management server 200, as in step S214.

In step SA20, the CPU 11 deletes the snapshot stored in the storage 12 of the in-vehicle server 10, as in step S216.

In step SA22, the CPU 11 notifies the user in the automobile 100 that the data used by the user in automobile 100 has been deleted, and ends the process shown in FIG. 7. The address of the user may be included as a mail address in the "identification information" about the user, for example.

4. Data Management Process

In the exit process shown in FIG. 6, the CPU 11 collectively generates the working data (snapshot), and transmits the working data to the management server 200 when the user gets off the automobile 100. However, the CPU 11 may generate working data and transmit the working data to the management server 200 at regular time intervals.

Figure 8:
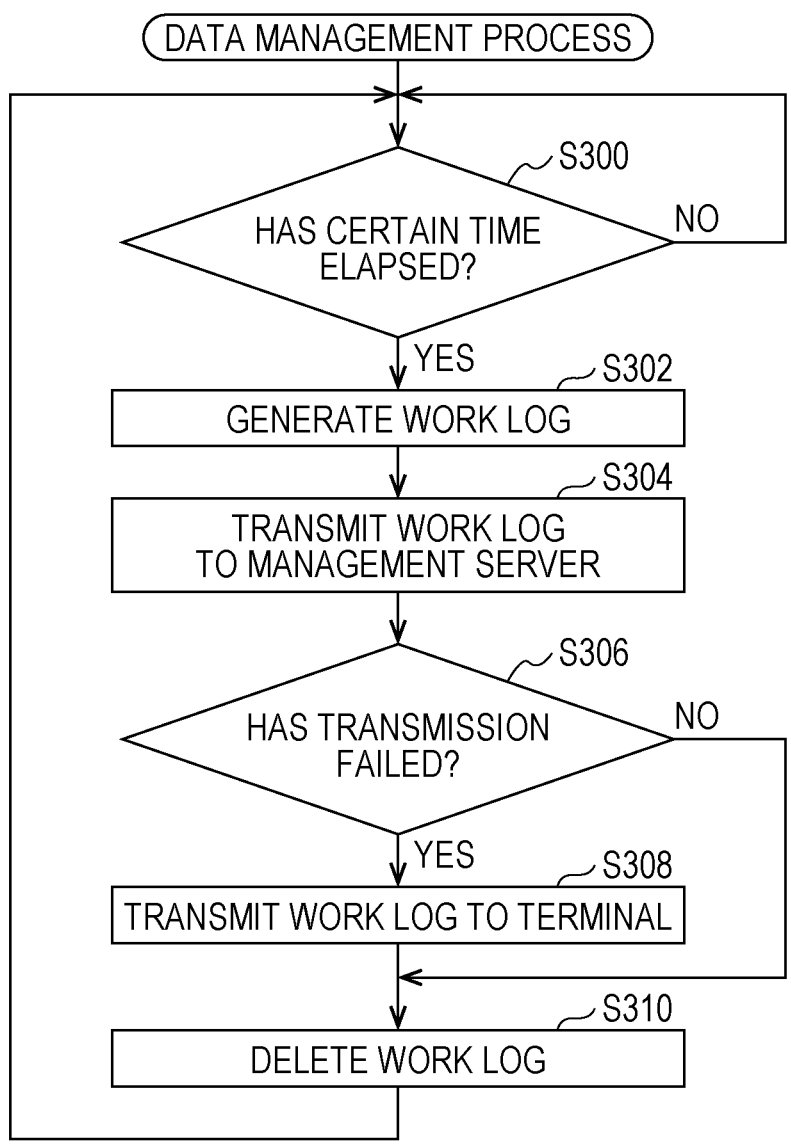
FIG. 8 is a flowchart of a process (a data management process) for generating working data and transmitting the working data to a management server at regular time intervals.

FIG. 8 is a flowchart of a process (a data management process) for generating working data and transmitting the working data to the management server 200 at regular time intervals. The process shown in FIG. 8 is realized by the CPU 11 of the in-vehicle server 10 executing a predetermined program. In one embodiment, the CPU 11 continuously performs the data management process during the period from detection of entry of a user into the automobile 100 till detection of exit of the user from the automobile 100.

Referring to FIG. 8, in step S300, the CPU 11 determines whether a certain time has elapsed since the previous control in step S300 was performed. Note that, in a case where the control in step S300 is performed for the first time, the CPU 11 in step S300 determines whether the certain time has elapsed since the start of the data management process. The CPU 11 continues the control in step S300 (NO in step S300) until determining that the certain time has elapsed. If the CPU 11 determines that the certain time has elapsed (YES in step S300), the CPU 11 proceeds with the control to step S302.

In step S302, the CPU 11 generates a work log of the user. The work log is an example of working data. The work log may be a work log in the in-vehicle server 10, may be a work log of a device (the MFP 20, the travel control device 30, the computer 50, or the like) in the automobile 100, or may be both. The work log may be generated in each device. The CPU 11 may acquire a work log from each device, instead of generating a work log of each device. The CPU 11 stores the generated or acquired work log into the storage 12.

In step S304, the CPU 11 transmits the work log generated (or acquired) in step S302 to the management server 200. The CPU 11 may compress and/or encrypt the work log, and then transmit the work log to the management server 200.

In step S306, the CPU 11 determines whether the transmission of the work log in step S304 has failed. For example, in a case where the CPU 11 has received data indicating that the transmission of the work log has been correctly performed from the management server 200 within a predetermined time after the transmission in step S304, the CPU 11 determines that the transmission of the work log has been successful. In a case where the CPU 11 has not received the data, the CPU 11 determines that the transmission of the work log has failed. If the CPU 11 determines that the transmission of the work log has failed (YES in step S306), the CPU 11 proceeds with the control to step S308. If the CPU 11 determines that the transmission of the work log has succeeded (NO in step S306), the CPU 11 proceeds with the control to step S310.

In step S308, the CPU 11 transmits the work log to the user in the automobile 100. The CPU 11 may compress and/or encrypt the work log, and then transmit the work log to the user. The address of the user may be included as a mail address in the "identification information" about the user, for example.

In step S310, the CPU 11 deletes the work log stored in the storage 12, and then returns the control to step S300.

In the data management process described above, a work log can be registered in the management server 200 on a regular basis.

Note that, in a case where the transmission of the work log in step S310 has failed, the CPU 11 may return the control to step S300 until the user exits the automobile 100. When the user exits the automobile 100, if there is a work log that has been transmitted neither to the management server 200 nor to the user, the CPU 11 may hold the work log even after the user exited the automobile 100. In this case, the CPU 11 repeatedly attempts to transmit the work log to the user. The CPU 11 deletes the work log from the storage 12 on condition that the transmission of the work log to the user has succeeded. Thus, even in a case where a user has exited the automobile 100 in a place with a poor communication environment, the work log immediately before the exit of the user can be provided to the user without fail. The user can restore the state of the work performed in the automobile 100, using the work log registered in the management server 200 and the work log transmitted to (the mail address of) the user.

In the data management process shown in FIG. 8, the criterion used in step S300 is merely an example. The control in and after step S302 is not necessarily performed at regular time intervals. That is, the CPU 11 generates a work log when a certain condition is satisfied, and the certain condition is not limited to a lapse of a certain time.

For example, the control in and after step S302 may be performed on condition that a user has input an instruction to generate a work log to the in-vehicle server 10. In this case, in step S300, the CPU 11 determines whether the above instruction has been input. If the CPU 11 determines that the instruction has been input, the CPU 11 proceeds with the control to step S302. A user can input the above instruction to the in-vehicle server 10 via the input device 52, for example.

5. Modification (1)

Figure 9:
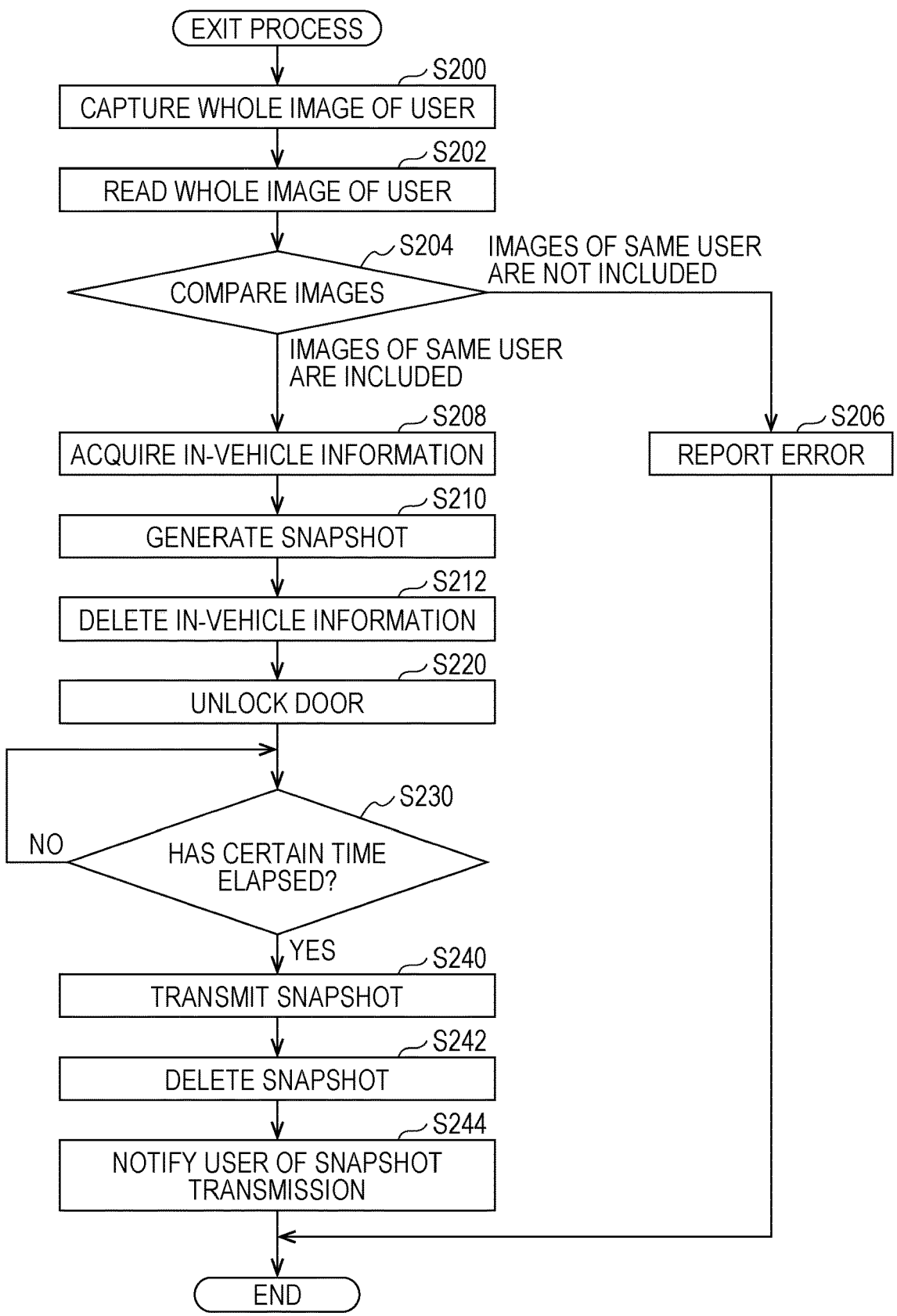
FIG. 9 is a flowchart of a first modification of the exit process shown in FIG. 6.

FIG. 9 is a flowchart of a first modification of the exit process shown in FIG. 6. In the exit process shown in FIG. 9, the CPU 11 performs control in steps S200 through S212 in the same manner as in the exit process shown in FIG. 6. After the control in step S212, the CPU 11 proceeds with the control to step S220.

In step S220, the CPU 11 causes the door lock 44 to unlock the door 120, and proceeds with the control to step S230.

In step S230, the CPU 11 determines whether a certain time has elapsed since the start of the exit process, and continues the control in step S230 (NO in step S230) until determining that the certain time has elapsed. If the CPU 11 determines that the certain time has elapsed (YES in step S230), the CPU 11 proceeds with the control to step S240.

In step S240, the CPU 11 transmits the snapshot generated in step S210 to the management server 200.

In step S242, the CPU 11 deletes the snapshot stored in the storage 12 of the in-vehicle server 10.

In step S244, the CPU 11 notifies the exiting user that the data used by the user in automobile 100 has been deleted, and ends the process shown in FIG. 9.

In the exit process described above with reference to FIG. 9, after a certain time has elapsed since detection of exit of the user, the CPU 11 transmits the snapshot to the management server 200, and deletes the snapshot.

6. Modification (2)

Figure 10:
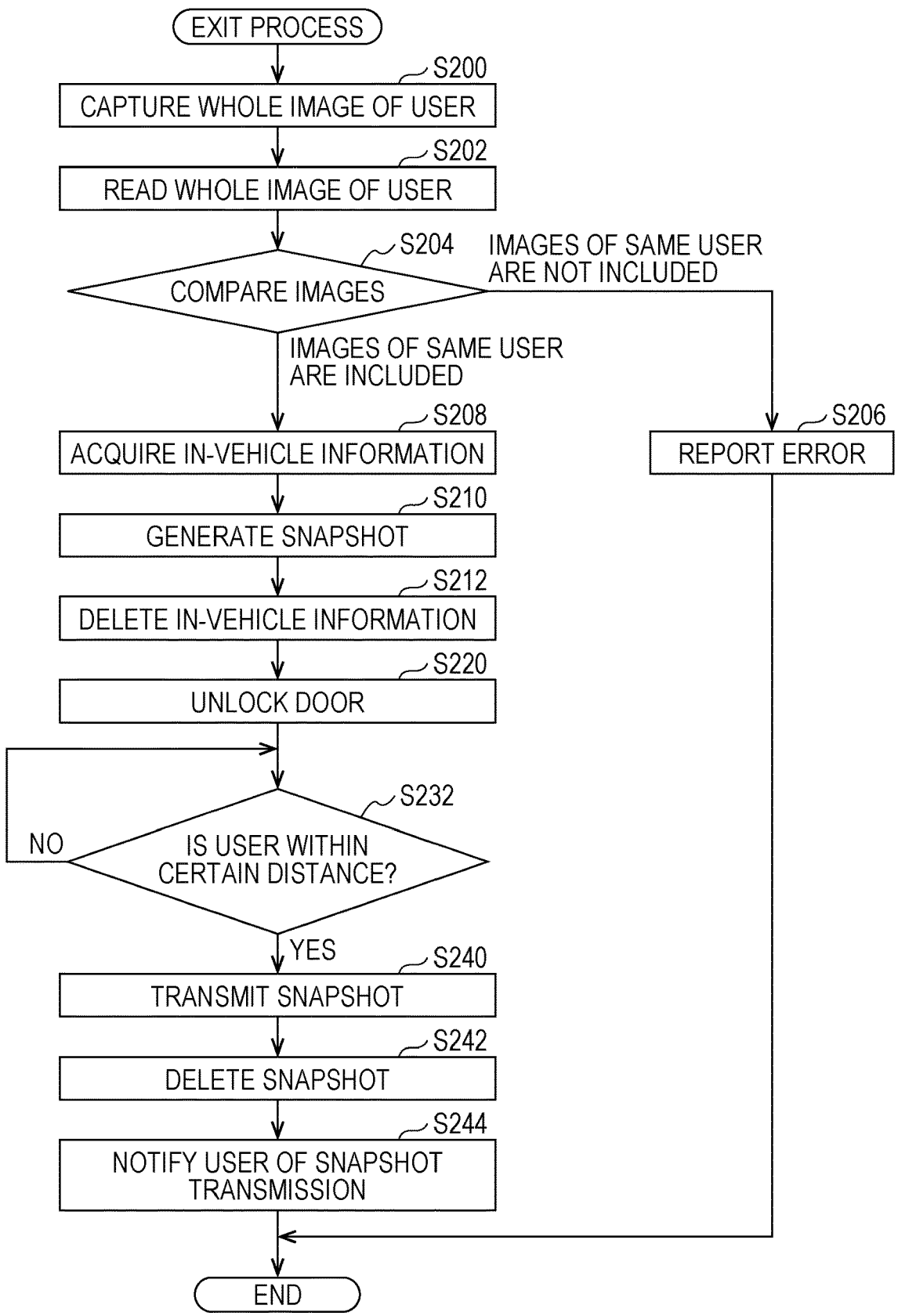
FIG. 10 is a flowchart of a second modification of the exit process shown in FIG. 6.

FIG. 10 is a flowchart of a second modification of the exit process shown in FIG. 6. The exit process shown in FIG. 10 includes step S232, instead of step S230 of the exit process shown in FIG. 9.

In step S232, the CPU 11 determines whether the user who has exited the automobile 100 is within a certain distance from the automobile 100. In one embodiment, the beacon receiver 47 is used in the determination in step S232.

More specifically, the CPU 11 determines whether the beacon receiver 47 has received a beacon output from the terminal 90 of the user who was in automobile 100. The information for identifying the beacon output from the user terminal 90 of the user is included in the "identification information" about the user, for example.

In a case where the beacon receiver 47 has received the beacon, the CPU 11 determines that the user who has exited the automobile 100 is within the certain distance from the automobile 100. In a case where the beacon receiver 47 has not received the beacon, the CPU 11 determines that the user who has exited the automobile 100 is not within the certain distance from the automobile 100.

If the CPU 11 determines that the user is within the certain distance from the automobile 100 (YES in step S232), the CPU 11 repeats the control in step S232. If the CPU 11 determines that the user is not within the certain distance from the automobile 100 (NO in step S232), the CPU 11 proceeds with the control to step S240.

After that, the CPU 11 performs the control in and after step S240 as in the exit process shown in FIG. 9.

In the exit process described above with reference to FIG. 10, if the user who has exited the automobile 100 has moved away from the automobile 100 (or is not within the certain distance from the automobile 100), the CPU 11 transmits the snapshot to the management server 200, and then deletes the snapshot.

7. Modification (3)

Figure 11:
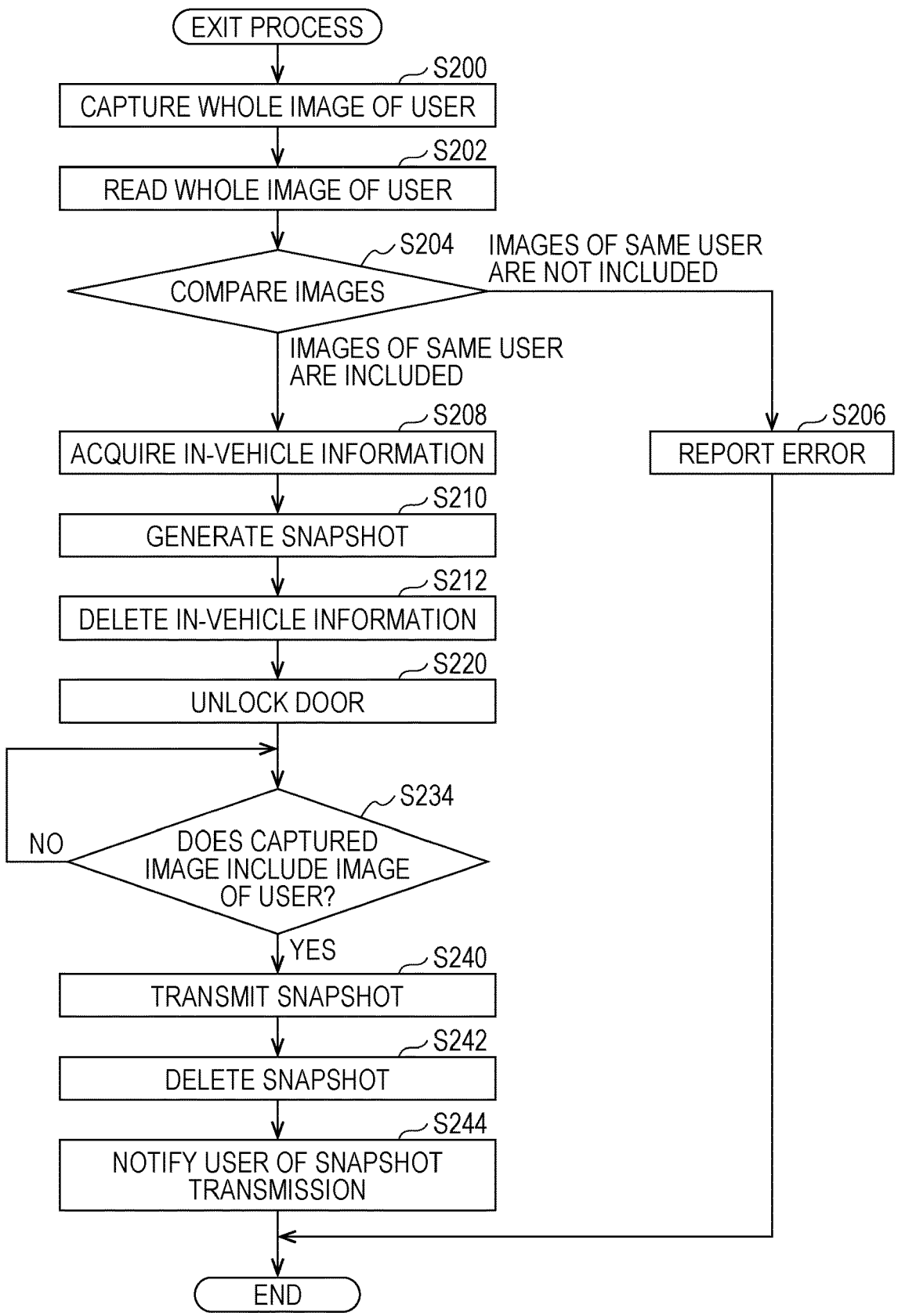
FIG. 11 is a flowchart of a third modification of the exit process shown in FIG. 6.

FIG. 11 is a flowchart of a third modification of the exit process shown in FIG. 6. The exit process shown in FIG. 11 includes step S234, instead of step S230 of the exit process shown in FIG. 9.

In step S234, the CPU 11 determines whether the user who has exited the automobile 100 is included in an image captured by the vehicle-mounted camera 46. In one embodiment, the CPU 11 uses the whole image of the user captured in step S104 in determining whether the user is included in an image captured by the vehicle-mounted camera 46.

If the CPU 11 determines that the user who has exited the automobile 100 is included in the image captured by the vehicle-mounted camera 46 (YES in step S234), the CPU 11 repeats the control in step S234. Every time the CPU 11 repeats the control in step S234, the CPU 11 acquires the latest captured image from the vehicle-mounted camera 46. If the CPU 11 determines that the user who has exited the automobile 100 is not included in the image captured by the vehicle-mounted camera 46 (NO in step S234), the CPU 11 proceeds with the control to step S240.

After that, the CPU 11 performs the control in and after step S240 as in the exit process shown in FIG. 9.

In the exit process described above with reference to FIG. 11, if the user who has exited the automobile 100 has moved sufficiently away from the automobile 100 (or is no longer included in an image captured by the vehicle-mounted camera 46), the CPU 11 transmits the snapshot to the management server 200, and then deletes the snapshot.

8. Modifications of the Environment Provided in the Automobile 100

The CPU 11 of the in-vehicle server 10 may perform generation of a snapshot (step S210) and generation of a work log (step S302) in a virtual OS. After the user exits the automobile 100, the CPU 11 may delete the snapshot and also delete the virtual OS.

The in-vehicle server 10 may be provided with a virtualization program including a virtual OS environment from the management server 200. In this case, the virtualization program is included in the identification information the CPU 11 acquires in step S106, for example. After the user exits the automobile 100, the CPU 11 may delete the snapshot and also delete the virtual OS.

9. Notes

Various changes can be made to the information processing system described above. For example, the MFP 20 can be installed integrally with the in-vehicle server 10 in the information processing system. As such an MFP 20 is mounted on a mobile object, it is possible to save space inside the mobile object when the mobile object functions as a mobile office.

In the information processing system, the computer 50 may be installed integrally with the in-vehicle server 10.

According to an embodiment of the present disclosure, the security level in a mobile object is controlled in accordance with entry/exit of a user into/from the mobile object. Thus, the environment in the mobile object in which an information processing apparatus is installed can be controlled at an optimized security level.

Although embodiments of the present invention have been described and illustrated in detail, the disclosed embodiments are made for purposes of illustration and example only and not limitation. The scope of the present invention should be interpreted by terms of the appended claims, and it should be understood that equivalents of the claimed inventions and all modifications thereof are incorporated herein. Further, the inventions described in the embodiments and the respective modifications are intended to be carried out independently of one another or in combination, wherever possible.

What is claimed is:

1. An information processing apparatus installed in a mobile object, the information processing apparatus comprising:
    a memory;
    a communicator that is used to communicate with a server;
    a hardware processor that is configured to:
        detect entry/exit of a user into/from the mobile object;
        in response to detecting entry of the user into the mobile object, acquire identification information associated with the user from the server;
        store the identification information associated with the user who has entered the mobile object into the memory;
        control a security level in the mobile object, in accordance with entry/exit of a user into/from the mobile object;
        detect whether the user is within a certain distance from the mobile object,
        in response to the hardware processor detecting that the user has exited the mobile object and then is not within the certain distance from the mobile object, the hardware processor transmits revised identification information associated with the user to the server; and
        when the hardware processor detects exit of the user from the mobile object, the hardware processor deletes the revised identification information from the memory.

2. The information processing apparatus according to claim 1, wherein the identification information includes system settings of the user.

3. The information processing apparatus according to claim 2, wherein the system settings includes network settings of the user.

4. The information processing apparatus according to claim 1, wherein the identification information includes working data of the user.

5. The information processing apparatus according to claim 4, wherein the working data includes data generated or edited after the user entered the mobile object.

6. The information processing apparatus according to claim 1, further comprising
    a communicator that is used to communicate with the server,
    wherein the identification information is registered beforehand in the server.

7. The information processing apparatus according to claim 6, wherein the identification information is registered as a snapshot in the server.

8. The information processing apparatus according to claim 6, wherein, when the hardware processor detects exit of the user from the mobile object, the hardware processor transmits the identification information to the server before deleting the identification information from the memory.

9. The information processing apparatus according to claim 8, wherein the hardware processor generates a snapshot of the identification information, and transmits the snapshot to the server, to transmit the identification information to the server.

10. The information processing apparatus according to claim 8,
    wherein the hardware processor detects entry/exit of each of at least two users, and
    the hardware processor transmits the identification information to the server, the identification information being associated with a user whose exit from the mobile object has been detected by the hardware processor.

11. The information processing apparatus according to claim 8,
    wherein the hardware processor stores, into the memory, the identification information acquired from the server, and,
    when the identification information is transmitted to the server, the hardware processor deletes the identification information from the memory.

12. The information processing apparatus according to claim 6, wherein, after a certain period has elapsed since the hardware processor detected the exit of the user from the mobile object, the hardware processor transmits the identification information to the server.

13. The information processing apparatus according to claim 6, further comprising
    a camera that captures an image outside the mobile object,
    wherein, when the user is no longer identified in an image captured by the camera after the hardware processor detected the exit of the user from the mobile object, the hardware processor transmits the identification information to the server.

14. The information processing apparatus according to claim 6, wherein, when a shock not smaller than a certain threshold is applied to the mobile object, the hardware processor transmits the identification information to the server.

15. The information processing apparatus according to claim 1, wherein the identification information includes at least one of a destination and a route as control information for the mobile object.

16. The information processing apparatus according to claim 1, wherein the hardware processor changes the number of times deletion is performed, in accordance with a confidentiality level of the identification information.

17. The information processing apparatus according to claim 1, wherein, when the identification information is deleted, the hardware processor notifies a terminal carried by the user of the deletion.

18. The information processing apparatus according to claim 1,
wherein the identification information includes information that specifies a security level of a device mounted on the mobile object, and
the hardware processor transmits the information that specifies a security level to the device mounted on the mobile object.

19. The information processing apparatus according to claim 1,
wherein the communicator is used to communicate with a terminal carried by the user,
wherein, when a predetermined condition is satisfied, the hardware processor transmits working data of the user to the server, and,
when the hardware processor is not able to communicate with the server, the hardware processor transmits the working data to the terminal carried by the user.

20. The information processing apparatus according to claim 19,
wherein the hardware processor
stores the working data into the memory, and
deletes, from the memory, the working data transmitted to one of the server and the terminal carried by the user.

21. The information processing apparatus according to claim 1, wherein detection of entry of the user into the mobile object by the hardware processor includes communication with a terminal carried by the user.

22. An information processing system comprising:
an information processing apparatus installed in a mobile object according to claim 1; and
the server capable of communicating with the information processing apparatus,
wherein the server includes a storage that stores identification information associated with the user, and,
when the hardware processor detects entry of the user into the mobile object, the hardware processor acquires at least part of the identification information from the server.

23. The information processing apparatus according to claim 1, wherein the hardware processor is further configured to revise the identification information of the user based on user activity within the mobile object.

24. The information processing apparatus according to claim 23, wherein the identification information of the user includes working data related to the information processing apparatus that is installed in the mobile object.

25. A non-transitory recording medium storing a computer readable program to be executed by a computer in an information processing apparatus installed in a mobile object, the program causing the computer to perform:
detecting entry/exit of a user into/from the mobile object;
controlling a security level in the mobile object, in accordance with entry/exit of the user into/from the mobile object;
in response to detecting entry of the user into the mobile object, acquiring identification information associated with the user from the server;
storing the identification information associated with the user who has entered the mobile object into a memory;
detecting whether the user is within a certain distance from the mobile object;
transmitting, in response to detecting that the user has exited the mobile object and then is not within the certain distance from the mobile object, revised identification information associated with the user, to the server; and
when detecting exit of the user from the mobile object, deleting the revised identification information from the memory.

* * * * *